United States Patent Office 3,446,065
Patented May 27, 1969

3,446,065
AUTOMATIC PROBING APPARATUS
Mordechai Wiesler, Lexington, and Avigdor Goren, Cambridge, Mass., assignors to Transistor Automation Corporation, Cambridge, Mass., a corporation of Massachusetts
Filed Aug. 11, 1965, Ser. No. 478,902
Int. Cl. G01b 5/28, 7/34
U.S. Cl. 73—105                    5 Claims

ABSTRACT OF THE DISCLOSURE

A probe mounting device is provided for use in testing and performing other operations on objects such as integrated circuit wafers. The probe mounting mechanism includes a pair of spaced parallel leaf springs having the probe mounted at one end and a support rigidly securing the opposite end of the springs. The parallel mounting arrangement produces a straight line motion of the probe tip when it is deflected. A joy stick mechanism supports the springs in such a fashion that the spring assembly may be moved in any direction through a plane parallel to the planes of the springs.

---

Figure 1:
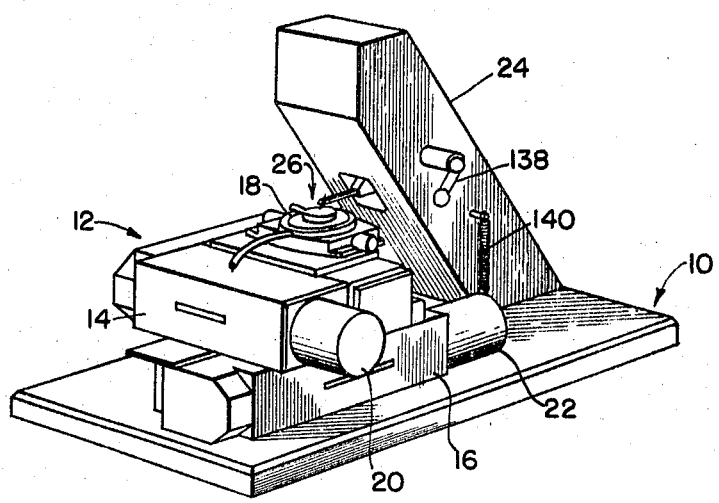

This invention relates generally to automatic probing mechanisms and more particularly is directed towards an apparatus for reciprocating an object along one axis as it is indexed along two other mutually perpendicular axes in order to perform operations on the object. This invention also includes a novel probe mounting mechanism.

In copending U.S. application Ser. No. 449,754 filed Apr. 2, 1965, and entitled, "Programmable Positioning Table," there is disclosed an apparatus adapted to support a specimen or other object and to move it according to a predetermined program along precisely defined paths in a step and repeat manner. The apparatus disclosed in the copending application is adapted to operate along X and Y axes which normally lie in the horizontal plane. The device is particularly useful in performing a multiplicity of operations such as welding, testing and the like which must be repeated a number of times on a surface and within a very small area.

The present invention has for one of its objects the providing of improvements in automatic probing mechanisms used in testing of microeletcronic devices such as integrated circuits, transistors, and diodes. These devices are fabricated in multiplicity on a wafer in grid-like array. The purpose of the probing machine is to make an electrical contact to each of the devices on the wafer. The smallness of these devices necessitate high accuracy mechanisms to position the test probes onto the test points provided in each device.

Another object of this invention is to provide a platform for reciprocating a specimen or other object rapidly and precisely along a given axis.

A further object of this invention is to provide means for reciprocating an object vertically while the object is being translated horizontally.

Yet another object of this invention is to provide an improved probe for use in repetitive testing of various objects.

Still another object of this invention is to provide a novel switching device for use in detecting small movements and dimensions.

More particularly, this invention features an apparatus for reciprocating an object along a given axis, comprising a base, a wedge slideably mounted on the base, actuating means for reciprocating the wedge along one axis and a stage adapted to support the object slideably engaging the wedge. The stage is restricted by means of a metal diaphragm to move along one axis only in its response to reciprocation of the wedge without any motion whatsoever along other axes perpendicular to the first mentioned axis. Thus reciprocation of the wedge along one axis will cause the stage and the object to reciprocate along a perpendicular axis.

This invention also features an improved probe, comprising a bracket, a pair of leaf springs mounted in spaced parallel relation to one another and carrying a probe tip on the free end thereof whereby displacement of the probe tip during operation will be essentially coaxial with the reciprocating movement of the object under test. The probe is provided with a novel positioning device for quickly and easily setting the position of the probe tip with respect to the work. Means are also provided for adjusting the tension of the probe tip suspension system and for precisely positioning the height of the probe tip with respect to the work.

This invention also features a novel switching device for detecting very small movements and dimensions and comprises a leaf spring adapted to be deflected by the sensed dimension or object. A strain gauge or piezoelectric crystal is bonded to one side of the spring and is adapted to generate a signal upon deflection of the spring. Amplifying means are provided for increasing the strength of the signal produced whereby a useful output is obtained upon each deflection of the spring.

Figure 2:
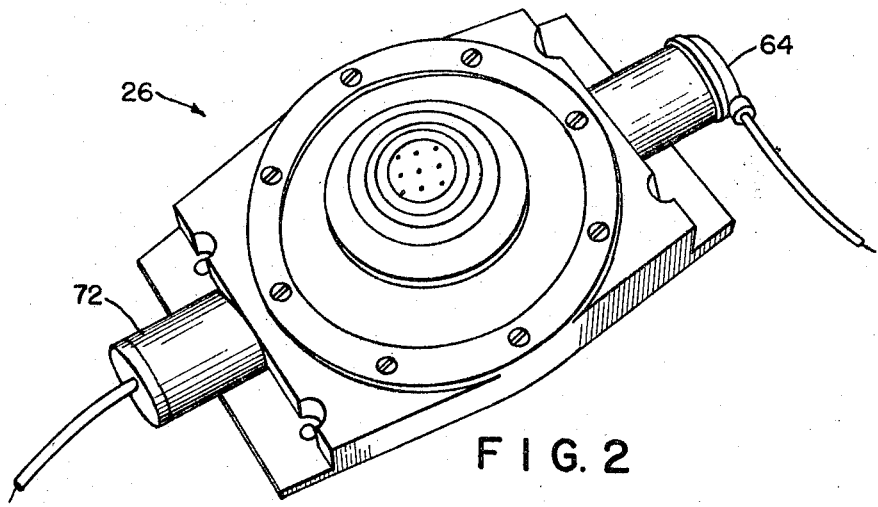
Figure 3:
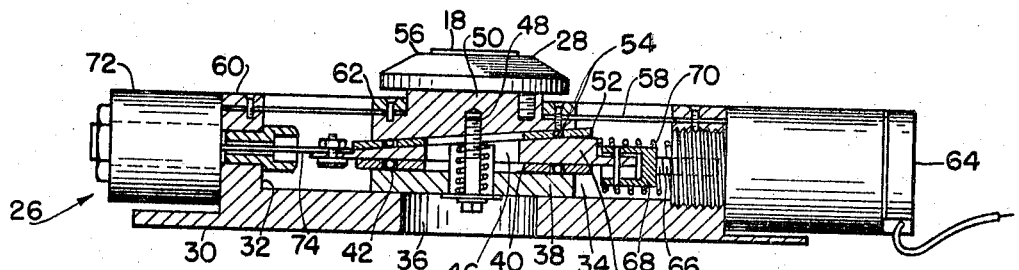
Figure 4:
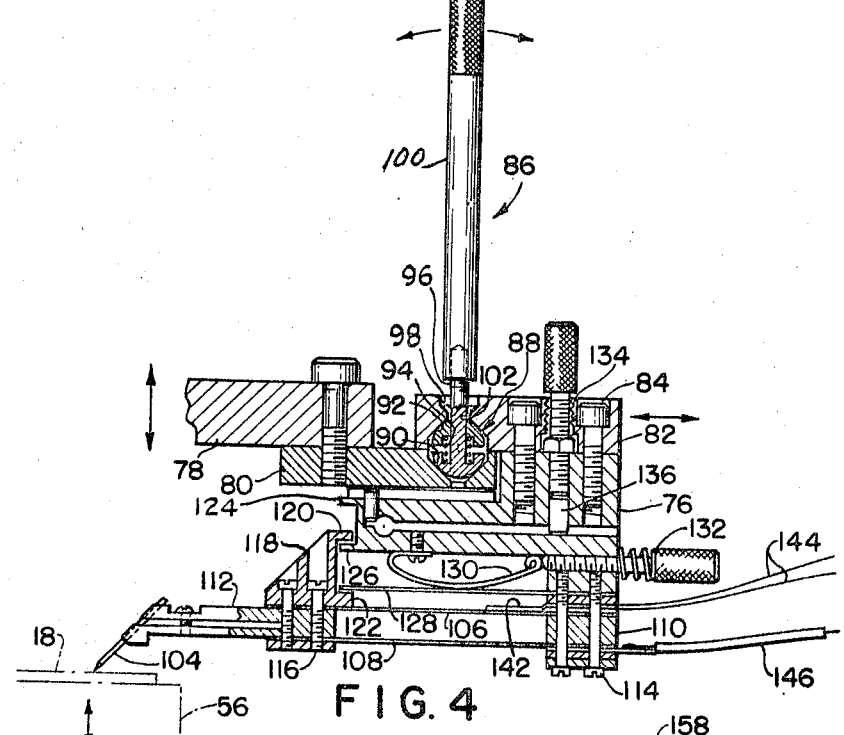
Figure 5:
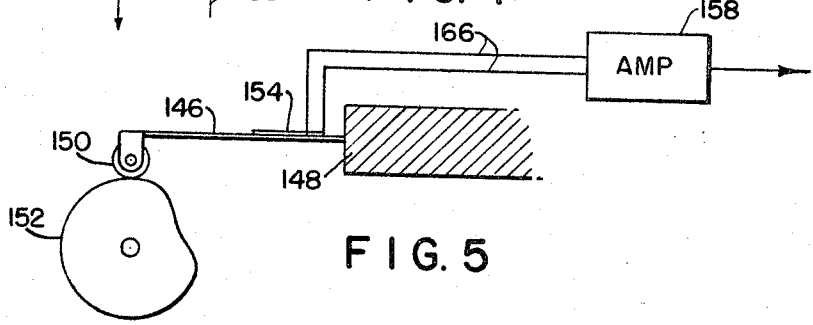

However, these and other features of the invention, along with further objects and advantages thereof, will become more readily apparent from the following dettailed description of a preferred embodiment of the invention, with reference being made to the accompanying drawings, in which:

FIG. 1 is a view in perspective of a probing apparatus made according to the invention, FIG. 2 is a view in perspective of a device made according to the invention for reciprocating an object along a given axis, FIG. 3 is a cross-sectional view taken along the line 3—3 of FIGURE 2, FIG. 4 is a sectional view in side elevation of a probe made according to the invention, and FIG. 5 is a side elevation, somewhat schematic, of a switching device made according to the invention.

Referring now to the drawings and particularly to FIG. 1 there is illustrated a probing apparatus certain portions of which are more fully illustrated and described in copending application 449,754. Generally, the apparatus is organized about a base 10 carrying an automatic table 12 including X and Y slides 14 and 16 which are more fully described in the foregoing copending application and which are adapted to move according to a predetermined program along X and Y horizontal coordinates. In this fashion a specimen or other object 18 mounted on the table may be moved in a step and repeat fashion into a number of indexed positions according to a predetermined schedule to carry out repetitive operations such as probing, welding, testing and the like. The slides are actuated by stepping motors 20 and 22 which, through a screw feed drive, move the slides back and forth in horizontal plane.

As shown in FIG. 1, the base 10 also carries an upwardly extending standard 24 which carries one or more test probes 26 to be described more fully below and other accessories.

The slides 14 and 16 it will be understood are adapted to move only in a horizontal plane or along X and Y axes. In order to permit the test object 18 to be moved vertically or along the Z axis a Z stage 26 is provided. This Z stage is mounted on top of the table 12 and is carried along the X and Y axes when the table is actuated. The Z stage 26 carries, in the illustrated embodiment, a vacuum chuck 28 which is particularly useful for mounting and positioning thin, fragile specimens.

Referring now more particularly to FIGS. 2 and 3, the construction and operation of the Z stage 26 will be described in detail. In general, the Z stage 26 is in the form of a rectangular plate 30 having upright annular walls 32 defining a shallow cylindrical chamber 34. The bottom of the plate 30 is formed with a central opening 36 over which is mounted a wedge guide 38 secured to the base of the plate. The guide 38 carries a flat ball cage 40 for bearing balls 42 trapped therein. Typically, the cage is fabricated from a relatively stiff phenolic resinous material.

Mounted directly above the cage and supported by the bearing balls 42 is a wedge 44. The wedge, in the illustrated embodiment, is formed with a 7° slope and preferably is formed of hardened metal. The wedge has a central opening 46 through which is passed a spring loaded stud 48. The stud 48 is connected at its upper end to a center plate or stage 50 and at its lower end to the wedge guide 38. A second cage 52 is disposed between the inclined upper surface of the wedge 44 and the lower inclined surface of the center plate 50. A set of bearing balls 54 are trapped by the cage 52 to provide a frictionless sliding connection between the wedge and the center plate. As shown the lower inclined surface of the center plate is formed with a 7° slope to match that of the wedge 44.

Mounted on top of the center plate 50 is a vacuum chuck 56 which is formed with a flat upper surface on which the specimen 18 is mounted. This surface is formed with a plurality of small ports which are connected to a vacuum source whereby the specimen will be held flat against the surface of the chuck when laid thereon.

In order to position the center plate 50 and to permit movement of the chuck and specimen only along one axis, an annular metal diaphragm 58 is provided. This diaphragm has its outer periphery mounted to the annular walls 32 of the plate 30 by means of a ring 60. The inner margins of the diaphragm are secured to the center plate by a smaller ring 62.

The wedge 44 is shifted laterally by means of a solenoid 64 mounted on one side of the plate 30 and having a connecting rod 66 which carries a yoke 68 engaging the thick end of the wedge. A coil spring 70 is compressed between the wall of the plate and the wedge and normally urges the wedge to the left as viewed in FIG. 3. The function of the solenoid is to pull the wedge to the right as viewed in FIG. 3. Thus, when the device is actuated, the solenoid pulls the wedge to the right and the center plate 50 is retracted downwardly. It will be understood that the spring loaded stud 48 serves to pull the center plate downwardly when the wedge is shifted to the right. When the solenoid is deenergized the compressed spring 70 pushes the wedge to the left thereby pushing the center plate upwardly again to its raised position. In order to insure a smooth action for the wedge, a pneumatic dashpot 72 is mounted to the plate 30 oppositely the solenoid 64. This dashpot connects to the thin end of the wedge by means of a member 74. The action of the dashpot is adjustable so that the upward movement of the chuck may be dampened in order to eliminate probe bounce and denting of the work.

It will now be understood that the specimen 18 placed on top of the chuck 56 may be indexed not only along X and Y coordinates by means of the slides 14 and 16, but also may be reciprocated precisely along a vertical axis (Z axis) by means of the Z stage 26. This permits the specimen to be raised and lowered into and out of contact with the probe 26 rather than raising and lowering the probe for each probing operation.

Referring now more particularly to FIG. 4 of the drawings, the probe mechanism will now be described in detail. The probe head is generally organized about a bifurcated block 76. The block 76 is suspended from a bracket 78 by means of a unique positioning mechanism comprising a relatively fixed lower plate 80 and a slidable upper plate 82. The block 76 is secured to the slidable upper plate 82 by means of screws 84 and it will be seen in FIG. 4 that the extended left hand portion of the block projects underneath the lower plate 80 to slidably engage with it. This arrangement holds the upper plate to the lower plate.

The two plates are coupled to one another by means of a joy stick adjusting mechanism indicated generally by reference character 86. This mechanism comprises a split ball 88, the lower half of which is seated in a recess 90 formed in the top surface of the lower plate 80 while the upper half of the ball is seated in a recess 92 formed in the lower surface of the upper plate 82. A coil spring 94 is compressed between the ball halves urging the two balls apart. A pin 96 will be seen to pass through a countersunk opening 98 formed in the upper plate 82 oppositely the recess 92. The lower end of the pin passes through the center of the upper ball halves, and through the coil spring and is fixed to the lower ball-half. Attached to the upper end of the pin is an elongated handle 100 to complete the joy stick mechanism. It will be understood that the connection between the pin, the ball halves and the opening 98 is such as to permit the pin to be swiveled with the pivot point being located below the upper ball half. Insofar as the upper ball half bears against the walls of the recess 92, it will be understood that angular movement of th ehandle will cause a lateral displacement of the upper plate 82. Since the block 76 is supported by the upper plate, this will also cause the block to be moved horizontally. The joy stick mechanism thus allows for fine adjustment of the probe with respect to the workpiece through the horizontal plane.

Suspended from the right hand end of the lower leg of the block 76 as viewed in FIG. 4 is a cantilevered spring mount for a probe tip 104. The mount comprises a pair of flat leaf springs 106 and 108 mounted in spaced parallel relation with the ends fixed together through a block 110 at the rear end thereof and by means of a split finger 112 at the forward end thereof. The finger 112 will be seen to carry the probe tip 104 at the forward split end thereof. Screws 114 clamp the rear end of the springs together and engage the lower end of the block 76. Screws 116 clamp the forward end of the springs together against the finger 112 and also serve to mount a movement limiting device 118 to the spring mount. This device will be seen to be formed with a pair of rearwardly extending shoulders 120 and 122 vertically spaced from one another. The upper shoulder 120 is adapted to move between two vertically spaced forwardly facing shoulders 124 and 126 formed on the left-hand end of the block 76. It will be understood that the probe tip which will deflect under the action of the reciprocating Z stage will be limited in its upward and downward movement by means of the shoulder 120 moving between the shoulders 124 and 126.

The shoulder 122 serves to engage the free end of a leaf spring 128 mounted parallel to the springs 106 and 108 and having its right hand end fixed to the block 76. Bearing against the top surface of the spring 128 is a bent spring 130, the left hand end of which is secured against the side of the block 76 and the right hand end of which bears against a screw adjust mechanism 132. The screw adjust mechanism is spring loaded and is adapted to bias the spring 130 to a greater or lesser extent by tightening or loosening the screw 132. It will be understood that if the screw 132 is tightened up against the free end of the spring 130, this will cause the spring 130 to be bent to a greater extent and will thereby push downwardly with greater force against the flat leaf spring 128. This in turn will force the leaf spring 128 downwardly against the shoulder 122 and thus stiffen the suspension of the spring mounting. By the same token the suspension may be softened by backing off on the screw 132 to permit the spring 130 to relieve its pressure against the spring 128.

In order to permit the probe tip to be raised or lowered with respect to the workpiece, means are provided for adjusting the vertical position of the probe tip. This includes adjusting screw 134 which is spring loaded and is threaded to the plate 82. The lower end of the adjusting screw passes down through the block 76 and bears against one end of a pin 136. The lower end of the pin 136 bears against a lower leg of the bifurcated block whereby the lower leg may be biased to or away from the main portion of the block according to the position of the screw 134. In this fashion by tightening down upon the screw 134, the lower leg will be biased downwardly pivoting the spring suspension system and thus raising the probe tip. By backing off on the screw the lower leg will bias upwardly and the probe tip will be lowered.

Other height adjustment means are provided for the probe assembly as a unit and these include a rack and pinion system (not shown) having a crank arm 138 shown in FIG. 1. This crank arm extends outwardly from the standard 24 and this mechanism also includes a micrometer adjusting mechanism 140.

Referring again to FIG. 4, there is shown a detecting device which responds to deflection of the probe tip. This detecting system includes a strain gauge 142 which may be of the conventional type or a semi-conductor type bonded directly to the flat surface of the spring 106. The strain gauge 142 is electrically connected to an amplifier by means of leads 144 and is adapted to generate a signal when the spring 106 is bent on deflection of the probe tip.

In this fashion, a probe tip may sense the presence or absence of a very thin dimension and may produce a signal which may in turn be used to control the operation of the probe. For example, when the probe apparatus is indexed vertically against the workpiece, the probe tip will be deflected on each indexing step. Should the indexing table move the workpiece out from under the probe tip, the tip will not deflect and this absence of a signal may be employed by a sensor circuit to move the table and the workpiece back under the probe tip by changing the direction of the table movement. In any event, the strain gauge is extremely sensitive and is capable of detecting height differentials on the order of .001 inch. The sensor circuitry typically incorporates a self-stepping circuit which will step the machine until the probe finds the specimen. Operation is as follows: When the Z stage comes up and the probe deflects by the specimen, a signal from the sensor stops the machine and delivers a start-test signal to asociated test gear. At the end of the test, the machine will index and repeat. If upon the Z stage coming up no signal is generated in the sensor because the probe is off the workpiece, the circuit will cause the machine to make one step along the X axis but reverse direction along the Y axis. The machine will self-set automatically along the new Y direction until the probe comes under the workpiece again. During this maneuver no start-test signal is delivered until the probe is again on the workpiece.

The probe tip is electrically connected to testing circuitry through leads 146.

In FIG. 5 there is illustrated a switching device based upon the probe deflection sensor described above. This switching device includes a flat spring 146, one end of which is mounted to a fixed support 148 and the opposite end of which carries a roller 150. The roller 150 is adapted to bear against a moving object such as a cam 152 so that the spring will be deflected each time the cam lobe moves against the roller. A strain gauge 154 such as a piezo electric crystal is bonded to the surface of the spring and is connected by leads 166 to an amplifier 158. In this fashion when the spring is deflected a signal will be generated by the strain gauge which signal will be amplified for use in operating a control device such as a relay, for example. Obviously, the switch provided by the system may be used in a number of applications and provides an extremely durable and highly sensitive switch.

The probing apparatus described above defines an extremely precise, efficient and fast working system capable of performing repetitive probing operations on a given specimen. In practice the specimen or work may be mounted on the chuck and the system pre-programmed to carry out step and repeat operations. Thereafter, once the machine has started it may be left unattended since the apparatus is adapted to function automatically. In the event that the probe, for example, detects an imperfection in the workpiece, the spot may be marked automatically by means of an inker, for example, adapted to move automatically against the work and leave a visible mark for an inspector once the piece has been fully examined by the probe. In view of the fact that the workpiece is moved to and away from the probe rather than the probe being moved to and away from the work, the machine has been greatly simplified, since the workpiece is quite light in relation to the multitude of probes. Also, the use of the parallel springs supporting the probe insures that the probe itsef is moved through a vertical plane thereby reducing any wiping motion against the workpiece to an absolute minimum. The parallelogram suspension system also insures a constant pressure for the probe against the workpiece regardless of the setting. The side motion of the probe is substantially eliminated regardless of the elevation of the point.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

Having thus described the invention, what we claim and desire to obtain by Letters Patent of the United States is:

1. A probe mounting device, comprising:
  (a) a support,
  (b) a pair of spaced parallel leaf springs rigidly connected at one end to said support,
  (c) a probe mounted to the opposite end of said springs whereby pressure applied to said probe in a direction perpendicular to the planes of said springs will cause said probe to deflect in a substantially straight line,
  (d) means mounting said support for limited lateral movement in any lateral direction through a plane parallel to the plane of said springs.

2. A probe mounting device, comprising:
  (a) a support,
  (b) a pair of spaced parallel leaf springs rigidly connected at one end to said support,
  (c) a probe mounted at the opposite end of said springs whereby pressure applied to said probe in a direction perpendicular to the planes of said springs will cause said probe to deflect in a substantially straight line,
  (d) means mounting said support for limited lateral movement through a plane parallel to the planes of said springs,
  (e) said mounting means including a pair of superimposed members slidably connected to one another, said members being formed with oppositely facing matching hemispherical recesses, a spherical member mounted in said recesses between said members, an elongated member connected to said spherical member and extending outwardly from one of said superimposed members whereby manipulation of said elongated member will laterally displace one of said superimposed members.

3. A probe mounting device, comprising:
  (a) a support,
  (b) a pair of spaced parallel leaf springs rigidly connected at one end to said support,
  (c) a probe mounted at the opposite end of said springs whereby pressure applied to said probe in a direction perpendicular to the plane of said springs will cause said probe to deflect in a substantially straight line,
  (d) means mounting said support for limited lateral movement through a plane parallel to the planes of said springs, and (e) a strain gauge bonded to one of said springs adapted to generate a signal upon deflection of said probe.

4. A probe mounting device, comprising:
(a) a support,
(b) a pair of spaced parallel leaf springs rigidly connected at one end to said support,
(c) a probe mounted at the opposite end of said springs whereby pressure applied to said probe in a direction perpendicular to the planes of said springs will cause the probe to deflect in a substantially straight line,
(d) means mounting said support for limited lateral movement through a plane parallel to the planes of said springs,
(e) means mounting said springs for moving said probe in a direction perpendicular to the planes of said springs.

5. A probe mounting device, comprising:
(a) a support,
(b) a pair of spaced parallel leaf springs rigidly connected at one end to said support,
(c) a probe mounted at the opposite end of said springs whereby pressure applied to said probe in a direction perpendicular to the planes of said springs will cause said probe to deflect in a substantially straight line,
(d) means mounting said support for limited lateral movement through a plane parallel to the planes of said springs, and
(e) spring loading means engaging said springs for varying the suspension thereof.

References Cited
UNITED STATES PATENTS

| | | | |
|---|---|---|---|
| 2,330,801 | 10/1943 | Abbott | 73—105 |
| 2,345,022 | 3/1944 | Williamson | 73—105 |
| 2,621,224 | 12/1952 | Priest | 73—105 |
| 2,703,007 | 3/1955 | Brems | 73—105 |
| 3,283,568 | 11/1966 | Reason | 73—105 |
| 3,293,585 | 12/1966 | Horn | 73—88.5 |
| 3,352,150 | 11/1967 | Fouretier | 73—88.5 |
| 3,074,175 | 1/1963 | Ludlam | 73—88.5 |
| 3,212,325 | 10/1965 | Katz et al. | 73—88.5 |

JAMES J. GILL, *Primary Examiner.*